US010621321B2

(12) United States Patent
Park et al.

(10) Patent No.: US 10,621,321 B2
(45) Date of Patent: Apr. 14, 2020

(54) STORAGE DEVICE HAVING FINGERPRINT RECOGNITION SENSOR AND OPERATING METHOD THEREOF

(71) Applicant: SAMSUNG ELECTRONICS CO., LTD., Suwon-si, Gyeonggi-do (KR)

(72) Inventors: Young-Jin Park, Incheon (KR); Ilgyu Jung, Hwaseong-si (KR)

(73) Assignee: Samsung Electronics Co., Ltd., Suwon-si, Gyreonggi-do (KR)

( * ) Notice: Subject to any disclaimer, the term of this patent is extended or adjusted under 35 U.S.C. 154(b) by 60 days.

(21) Appl. No.: 15/896,703

(22) Filed: Feb. 14, 2018

(65) Prior Publication Data

US 2018/0232509 A1 Aug. 16, 2018

(30) Foreign Application Priority Data

Feb. 14, 2017 (KR) ........................ 10-2017-0020080

(51) Int. Cl.

| | |
|---|---|
| ***G06K 9/00*** | (2006.01) |
| ***G06F 21/32*** | (2013.01) |
| ***G06F 21/79*** | (2013.01) |

(52) U.S. Cl.

CPC .............. *G06F 21/32* (2013.01); *G06F 21/79* (2013.01); *G06K 9/001* (2013.01); *G06K 9/0002* (2013.01); *G06K 9/0008* (2013.01); *G06K 9/00013* (2013.01); *G06K 9/00993* (2013.01)

(58) Field of Classification Search

CPC ........... G06K 9/00013; G06K 9/00087; G06K 9/00026; G06K 9/000926; G06F 21/32; G06F 21/79; G06F 17/3028; G06F 17/30256; G06F 16/5866

See application file for complete search history.

(56) References Cited

U.S. PATENT DOCUMENTS

| | | | |
|---|---|---|---|
| 7,353,992 | B2 | 4/2008 | Sugawara et al. |
| 7,496,763 | B2 | 2/2009 | Chiu et al. |
| 7,519,203 | B2 | 4/2009 | Chiu et al. |
| 7,679,133 | B2 | 3/2010 | Son et al. |
| 7,747,797 | B2 | 6/2010 | Abraham et al. |
| 7,762,470 | B2 | 7/2010 | Finn et al. |
| 8,000,502 | B2 | 8/2011 | Dave et al. |
| 8,553,466 | B2 | 10/2013 | Han et al. |
| 8,559,235 | B2 | 10/2013 | Yoon et al. |
| 8,654,587 | B2 | 2/2014 | Yoon et al. |

(Continued)

FOREIGN PATENT DOCUMENTS

| | | |
|---|---|---|
| JP | 2010262586 A | 11/2010 |
| KR | 20040076454 A | 9/2004 |

(Continued)

*Primary Examiner* — Amir Alavi

(74) *Attorney, Agent, or Firm* — Volentine, Whitt & Francos, PLLC

(57) ABSTRACT

A storage device includes at least one nonvolatile memory device, a memory controller that controls the at least one nonvolatile memory device, and a fingerprint recognition sensor that recognizes a fingerprint of a user. The at least one nonvolatile memory device includes at least one secure partition area being accessible by a host device when a fingerprint recognized by the fingerprint recognition sensor is the same as an enrolled fingerprint, and a public area being accessible by the host device regardless of a fingerprint recognition operation.

20 Claims, 14 Drawing Sheets

(56) References Cited

U.S. PATENT DOCUMENTS

| | | | | |
|---|---|---|---|---|
| 8,806,603 | B2 | 8/2014 | Svigals et al. | |
| 9,202,099 | B2 * | 12/2015 | Han | G06K 9/00006 |
| 9,342,725 | B2 * | 5/2016 | Vieta | G06K 9/00026 |
| 9,537,535 | B2 | 1/2017 | Lortz et al. | |
| 10,169,631 | B2 * | 1/2019 | Nogueyra | G06K 9/00013 |
| 10,198,615 | B2 * | 2/2019 | Kim | G06K 9/00013 |
| 10,339,178 | B2 * | 7/2019 | Kim | G06F 16/5866 |
| 10,372,962 | B2 * | 8/2019 | Wright | G06K 9/00026 |
| 2011/0082979 | A1 * | 4/2011 | Ramesh | G06F 12/1433 711/115 |
| 2011/0233648 | A1 | 9/2011 | Seol et al. | |
| 2011/0246790 | A1 | 10/2011 | Koh et al. | |
| 2018/0232509 | A1 * | 8/2018 | Park | G06F 21/32 |

FOREIGN PATENT DOCUMENTS

| | | | |
|---|---|---|---|
| KR | 100959275 | B1 | 5/2010 |
| KR | 100966236 | B1 | 6/2010 |
| KR | 20110023685 | A | 3/2011 |
| KR | 101549014 | B1 | 9/2015 |
| KR | 101622154 | B1 | 5/2016 |
| KR | 20160101248 | A | 8/2016 |

* cited by examiner

STORAGE DEVICE HAVING FINGERPRINT RECOGNITION SENSOR AND OPERATING METHOD THEREOF

CROSS-REFERENCE TO RELATED APPLICATIONS

A claim for priority under 35 U.S.C. § 119 is made to Korean Patent Application No. 10-2017-0020080 filed Feb. 14, 2017, in the Korean Intellectual Property Office, the entire contents of which are hereby incorporated by reference.

BACKGROUND

Embodiments of the disclosure relate to a storage device, and more particularly, to a storage device capable of improving a security function through fingerprint recognition and an operating method thereof.

The operating speed of a host, which communicates with a storage device, such as a computer, a smartphone, or a smart pad is improved as semiconductor manufacturing technologies develop. Furthermore, the size of content used in the storage device and a host device of the storage device is increasing. As such, a storage device with a more improved function is continuously required.

SUMMARY

Embodiments of the disclosure provide a storage device capable of improving a security function and an operating method thereof.

According to an embodiment, a storage device may include at least one nonvolatile memory device, a memory controller that controls the at least one nonvolatile memory device, and a fingerprint recognition sensor that recognizes a fingerprint of a user. The at least one nonvolatile memory device may include at least one secure partition area being accessible by a host device when a fingerprint recognized by the fingerprint recognition sensor is the same as an enrolled fingerprint, and a public area being accessible by the host device regardless of a fingerprint recognition operation.

According to another embodiment, an operating method of a storage device may include determining whether an operating mode of the storage device is a fingerprint mode, when the storage device is connected to a host device, recognizing a fingerprint of a user when the operating mode of the storage device is the fingerprint mode, and permitting an access of the host device to at least one area, which is determined in advance, of the storage device when the recognized fingerprint is the same as an enrolled fingerprint.

According to another embodiment, an operating method executed by a memory device includes: (1) communicating, to a host device, information identifying a secure region of the memory device available to a user in response to wirelessly receiving a first indication from a mobile communication device that the user has been biometrically identified and (2) withholding, from the host device, the information identifying the secure region of the memory device in response to wirelessly receiving a second indication from the mobile communication device that the user has not been biometrically identified.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments of the disclosure will be described more fully hereinafter with reference to the accompanying drawings, in which embodiments of the disclosure are shown.

Figure 1:
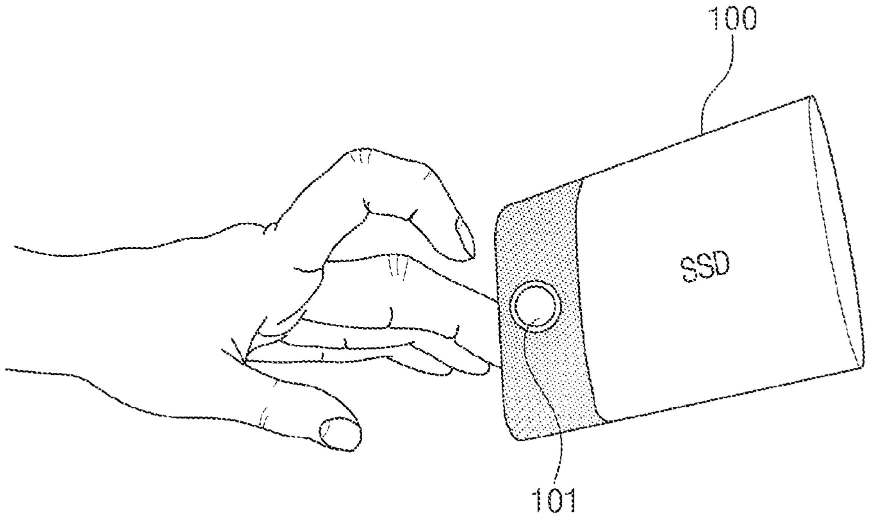
FIG. 1 is a view for describing a storage device, according to an embodiment of the disclosure.

FIG. 1 is a view for describing a storage device (SSD) 100, according to an embodiment of the disclosure. Referring to FIG. 1, the storage device 100 may include a fingerprint recognition sensor 101.

In an embodiment, the storage device 100 may be a removable storage device for storing data. For example, the storage device 100 may be a removable solid state drive (SSD). However, the storage device 100 according to an embodiment of the disclosure is not limited to the removable SSD. It should be understood that the storage device 100 is implemented using various types of storage devices.

The fingerprint recognition sensor 101 may be implemented to recognize a fingerprint of a user. In an embodiment, a recognized fingerprint may be stored in an internal memory of the storage device 100 for user enrollment. Here, the fingerprint stored in the internal memory may be data that are encrypted or encoded (e.g., hash coding) according to a manner that is in advance determined. In an embodiment, a recognized fingerprint may be compared with a fingerprint stored in the internal memory of the storage device 100 for user enrollment.

Meanwhile, the fingerprint recognition sensor 101 is illustrated in FIG. 1. However, embodiments of the disclosure may not be limited thereto. The storage device 100 according to an embodiment of the disclosure may be implemented to include various kinds of biometric recognition sensors for authenticating the user, for example, an iris recognition sensor, a heartbeat recognition sensor, and a vein recognition sensor.

In an embodiment, the fingerprint recognition sensor 101 may be activated in a security mode of the storage device 100. The storage device 100 may include at least one storage area corresponding to a fingerprint of an enrolled user. Here, the storage area may be a logical drive of the storage device recognized by a host device. In the security mode of the storage device 100, the host device may access a corresponding logical drive only when a fingerprint of a user is the same as an enrolled fingerprint.

Figure 2:
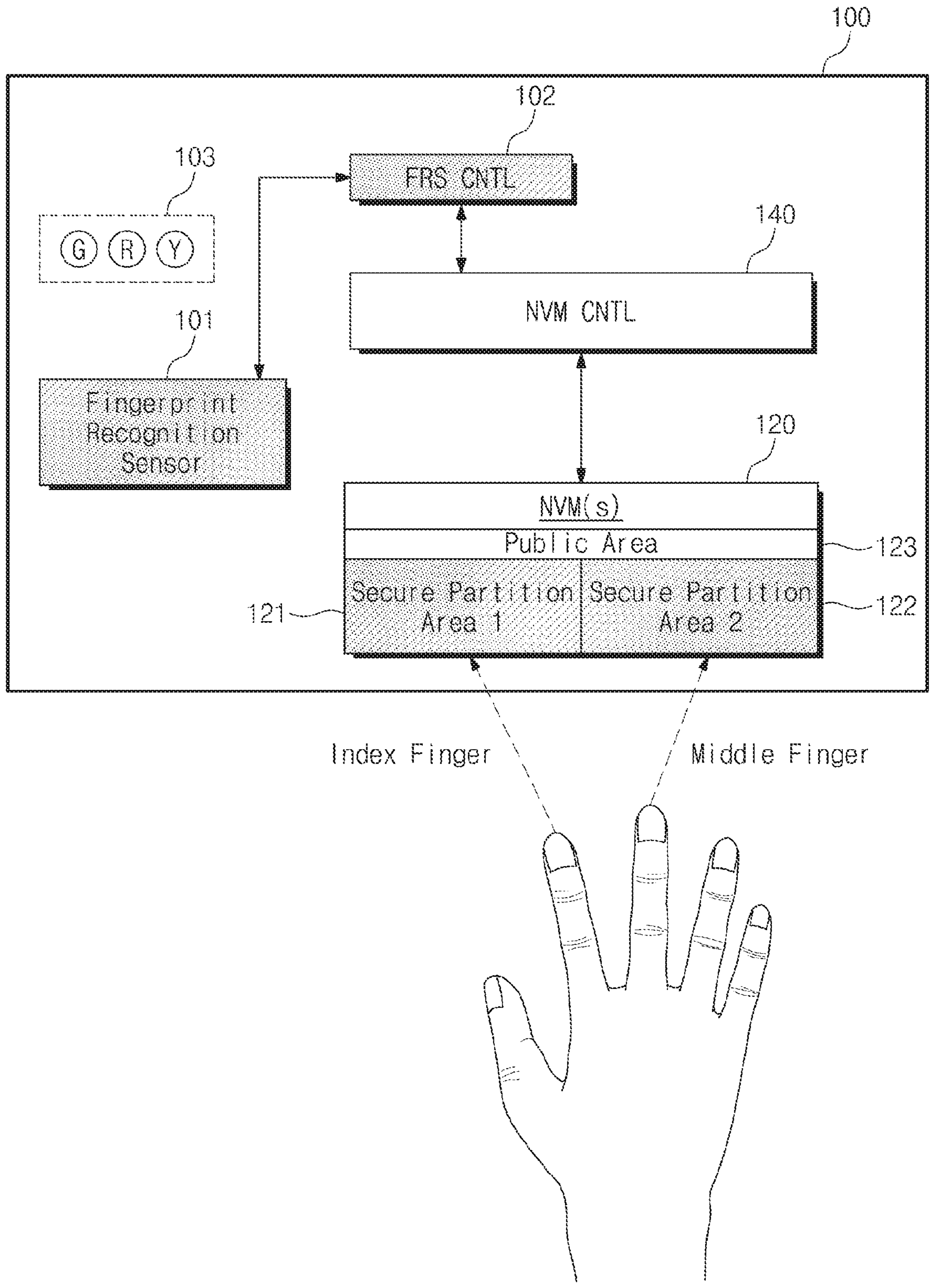
FIG. 2 is a view illustrating the storage device, according to an embodiment of the disclosure.

FIG. 2 is a view illustrating the storage device 100, according to an embodiment of the disclosure. Referring to FIG. 2, the storage device 100 may include the fingerprint recognition sensor 101, a fingerprint recognition sensor controller 102, a status indication device 103, at least one nonvolatile memory device (NVM(s)) 120, and a memory controller (NVM CNTL) 140.

The fingerprint recognition sensor 101 may be implemented to sense an electrical characteristic difference due to ridge and valley shapes of a fingerprint. For example, the fingerprint recognition sensor 101 may be implemented to sense a difference between capacitances corresponding to fingerprints, that is, a capacitance signal and to convert the sensed capacitance signal into an electrical signal. Meanwhile, it should be understood that a fingerprint recognition sensor according to an embodiment of the disclosure is able to recognize a fingerprint through various manners as well as a capacitance manner. For example, the fingerprint recognition sensor may be implemented with an optical image capture fingerprint recognition sensor, an ultrasonic image capture fingerprint recognition sensor, etc.

The fingerprint recognition sensor controller 102 may be implemented to control overall operations of the fingerprint recognition sensor 101. In an embodiment, the fingerprint recognition sensor controller 102 may determine whether to activate the fingerprint recognition sensor 101. For example, the fingerprint recognition sensor controller 102 may activate the fingerprint recognition sensor 101 based on an operating mode of the storage device 100. The fingerprint recognition sensor controller 102 may receive information about the operating mode of the storage device 100 from the memory controller 140. For example, when the operating mode is a security mode, the fingerprint recognition sensor controller 102 may activate the fingerprint recognition sensor 101.

Also, the fingerprint recognition sensor controller 102 may convert a received fingerprint in the form of data that is able to be enrolled at an internal memory of the storage device 100. Here, the internal memory may be the nonvolatile memory device 120. In an embodiment, the fingerprint recognition sensor controller 102 may receive a recognized fingerprint from the fingerprint recognition sensor 101, may convert (or code) the received fingerprint based on an algorithm determined in advance, and may provide the converted fingerprint to the nonvolatile memory controller 140 for fingerprint enrollment of the user. In an embodiment, with regard to enrolling and authenticating a user fingerprint, the fingerprint recognition sensor controller 102 may provide the memory controller 140 with a data write and read request.

Also, for fingerprint enrollment, the fingerprint recognition sensor controller 102 may compare a fingerprint recognized by the fingerprint recognition sensor 101 with a fingerprint enrolled at the internal memory of the storage device 100. For example, the fingerprint recognition sensor controller 102 may determine whether a user is legal, by receiving a sensed fingerprint from the fingerprint recognition sensor 101, reading an enrolled fingerprint of the user from the nonvolatile memory device 120, and comparing the received fingerprint and the read fingerprint. Also, the fingerprint recognition sensor controller 102 may display a fingerprint authentication state based on the determination result.

The status indication device 103 may be implemented to display a fingerprint authentication state associated with the storage device 100. For example, the status indication device 103 may include a plurality of light emitting diodes (e.g., G, R, and Y) for displaying the fingerprint authentication state. Here, a green light emitting diode "G" may indicate that a user fingerprint is the same as an enrolled fingerprint, a red light emitting diode "R" may indicate that the user fingerprint is different from the enrolled fingerprint, and a yellow light emitting diode "Y" may indicate that no enrolled fingerprint exists or a fingerprint is being enrolled. The status indication device 103 illustrated in FIG. 2 is composed of three diodes "G", "R", and "Y". However, the number of diodes of the status indication device 103 may not be limited thereto. Also, the status indication device 103 according to an embodiment of the disclosure may be implemented with a display device (e.g., a liquid crystal display (LCD)) for displaying a fingerprint authentication state.

Meanwhile, the fingerprint recognition sensor 101, the fingerprint recognition sensor controller 102, and the status indication device 103 are illustrated in FIG. 2 as independent configurations. However, embodiments of the disclosure may not be limited thereto. For example, the fingerprint recognition sensor 101, the fingerprint recognition sensor controller 102, and the status indication device 103 may be implemented with one fingerprint recognition module.

The at least one nonvolatile memory device 120 may be implemented to store data. The nonvolatile memory device 120 may include a first secure area 121, a second secure area 122, and a public area 123.

The first secure area 121 may be used to store data (e.g., private information) that needs security. In an embodiment, the first secure area 121 may be an area corresponding to a first fingerprint. Here, the first fingerprint may be a fingerprint of an index finger. For example, a host device may access the first secure area 121 of the nonvolatile memory device 120 only through the fingerprint of the index finger of the user. Meanwhile, the first fingerprint may be any one of fingerprints of a thumb, a middle finger, a ring finger, and a little finger.

The second secure area 122 may be used to store data that needs security. In an embodiment, the second secure area 122 may be an area corresponding to a second fingerprint. Here, the second fingerprint may be a fingerprint of a middle finger. For example, the host device may access the second secure area 122 of the nonvolatile memory device 120 only through the fingerprint of the middle finger of the user. Meanwhile, the second fingerprint may be any one of fingerprints of a thumb, an index finger, a ring finger, and a little finger.

Meanwhile, two secure areas 121 and 122 are illustrated in FIG. 2. However, it should be understood that the number of secure areas according to embodiments of the disclosure is not limited to "2".

The public area 123 may be used to store data that does not need security. A host device may be implemented to access the public area 123 of the nonvolatile memory device 120 regardless of a fingerprint.

Also, the nonvolatile memory device 120 may be a NAND flash memory, a vertical NAND flash memory (VNAND), a NOR flash memory, a resistive random access memory (RRAM), a phase change memory (PRAM), a magneto-resistive random access memory (MRAM), a ferroelectric random access memory (FRAM), a spin-transfer torque random access memory (STT-RAM), etc.

Furthermore, the nonvolatile memory device may be implemented to have a three-dimensional (3D) array structure. In an embodiment of the disclosure, a 3D memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The circuitry related to an operation of the memory cells may be located in the substrate or on the substrate. The term "monolithic" means that layers of each level of the array are directly deposited on the layers of each underlying level of the array.

In an embodiment of the disclosure, the 3D memory array includes vertical NAND strings that are vertically oriented such that at least one memory cell is located over another memory cell. The at least one memory cell may comprise a charge trap layer. Each vertical NAND string may include at least one selection transistor located over memory cells. At least one selection transistor may have the same structure as those of the memory cells and may be monolithically formed together with memory cells.

The three-dimensional memory array is formed of a plurality of levels and has word lines or bit lines shared among levels. The following patent documents, which are hereby incorporated by reference, describe suitable configurations for three-dimensional memory arrays, in which the three-dimensional memory array is configured as a plurality of levels, which is applied by Samsung Electronics Co. ®, with word lines and/or bit lines shared between levels: U.S. Pat. Nos. 7,679,133; 8,553,466; 8,654,587; 8,559,235; and US Pat. Pub. No. 2011/0233648. The nonvolatile memory according to an exemplary embodiment of the disclosure may be applicable to a charge trap flash (CTF) in which an insulating layer is used as a charge storage layer, as well as a flash memory device in which a conductive floating gate is used as a charge storage layer.

The memory controller (NVM CNTL) 140 may be implemented to control the nonvolatile memory device 120. Also, the memory controller 140 may control the storage device 100 in any one of a security mode and a normal mode. When an operating mode is the normal mode, the storage device 100 may permit a host access to all or a part of the nonvolatile memory device 120 regardless of a fingerprint. When an operating mode is the security mode, the storage device 100 may permit a host access to the first secure area 121 and the second secure area 122 of the nonvolatile memory device 120 through a fingerprint.

Also, the memory controller 140 may store a user fingerprint in an area of the nonvolatile memory device 120 in response to a write request of the fingerprint recognition sensor controller 102. Also, the memory controller 140 may read a user fingerprint stored in the nonvolatile memory device 120 in response to a read request of the fingerprint recognition sensor controller 102.

Meanwhile, the fingerprint recognition sensor controller 102 and the memory controller 140 are illustrated in FIG. 2 as independent configurations. However, the fingerprint recognition sensor controller 102 and the memory controller 140 may be implemented with a single controller.

The storage device 100 according to an embodiment of the disclosure may protect the whole drive through fingerprint recognition. Also, the storage device 100 according to an embodiment of the disclosure may protect some partitions through fingerprint recognition. For example, when fingerprint recognition fails, only a public partition of the storage device 100 may be recognized. In contrast, when fingerprint recognition succeeds, as well as the public partition, a secure partition of the storage device 100 may be recognized.

Figure 3:
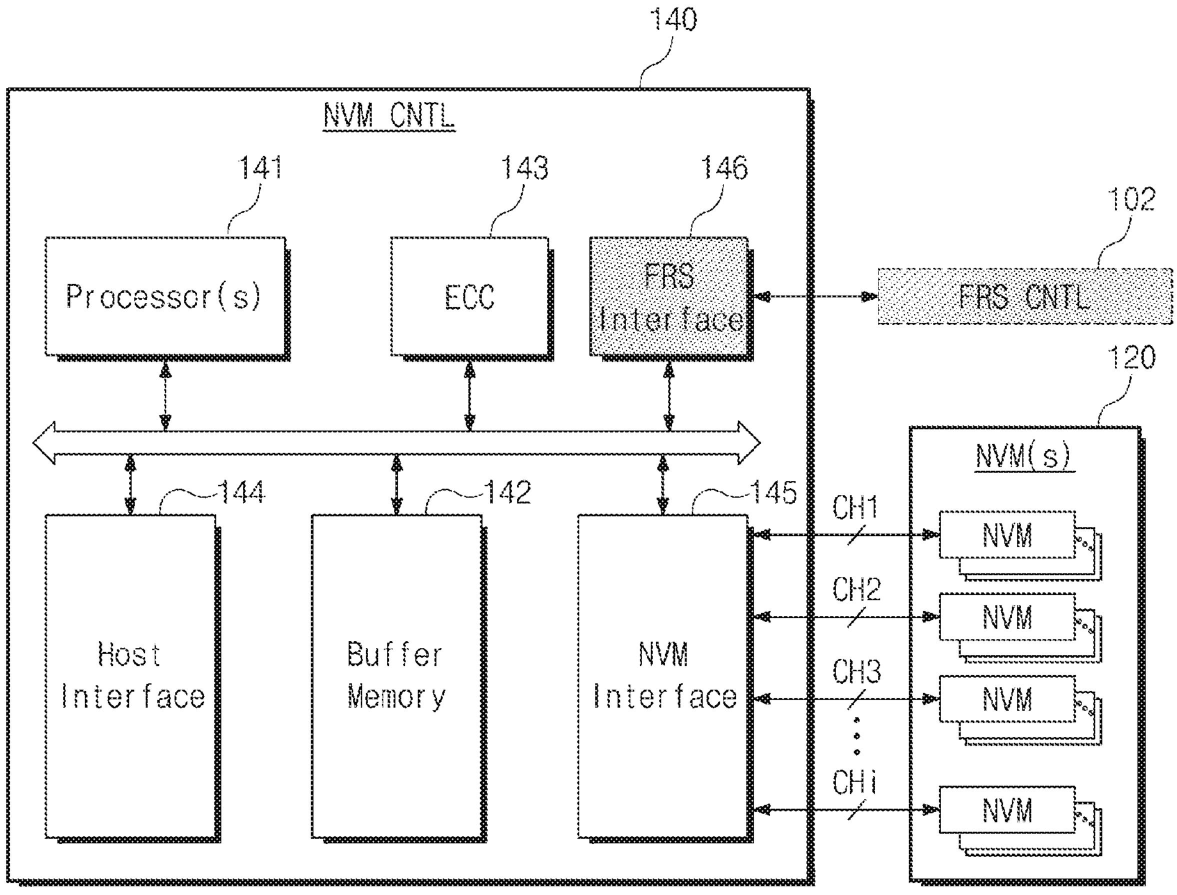
FIG. 3 is a diagram illustrating a memory controller, according to an embodiment of the disclosure.

FIG. 3 is a diagram illustrating the memory controller 140, according to an embodiment of the disclosure. Referring to FIG. 3, the memory controller 140 may include at least one processor 141, a buffer memory 142, an error correction circuit (ECC) 143, a host interface 144, a nonvolatile memory interface 145, and a fingerprint recognition sensor interface 146. The memory controller 140 may be connected to the nonvolatile memory device 120 through a plurality of channels CH1 to CHi (i.e., i being an integer of 2 or more). The memory controller 140 may be implemented to perform various management functions such as an error correction code (ECC) function, wear leveling, bad block management, and signal processing.

The at least one processor 141 may be implemented to process overall operations of the memory controller 140. For example, the processor 141 may manage the nonvolatile memory device 120 by using hardware, firmware, or software.

The buffer memory 142 may be implemented to temporarily store data needed for an operation of the memory controller 140. For example, in FIG. 3, the buffer memory 142 may be disposed inside the memory controller 140. However, embodiments of the disclosure may not be limited thereto. The buffer memory 142 according to an embodiment of the disclosure may be disposed outside the memory controller 140. In an embodiment, the buffer memory 142 may be a dynamic random access memory (DRAM), a static random access memory (SRAM), a phase-change random access memory (PRAM), etc.

The error correction circuit 143 may calculate a value of an error correction code of data to be programmed in a write operation, may correct data read in a read operation based on a value of an error correction code corresponding to the read data, and may correct an error of data recovered from the nonvolatile memory device 120. The error correction circuit 143 may generate an error correction code (ECC) for correcting a fail bit or error bit of data read from the nonvolatile memory device 120. Also, the error correction circuit 143 may generate data, to which a parity bit(s) is added, by performing error correction encoding on data to be provided to the nonvolatile memory device 120. The parity bit may be stored in the nonvolatile memory device 120. Moreover, the error correction circuit 143 may perform error correction decoding on data output from the nonvolatile memory device 120.

The error correction circuit 143 may be implemented to correct an error by using parity information. The error correction circuit 143 may correct an error by using coded modulation such as a low density parity check (LDPC) code, a Bose, Chaudhuri, Hocquenghem (BCH) code, a turbo code, a Reed-Solomon code, a convolution code, a recursive systematic code (RSC), a trellis-coded modulation (TCM), or a block coded modulation (BCM).

Even though not illustrated in FIG. 3, the memory controller 140 may further include a code memory that stores code data for an operation of the memory controller 140. The code memory may be implemented with a nonvolatile memory device.

The host interface 144 may be implemented to provide an interface function for interfacing with an external device. The host interface 144 may be connected with a host device through a communication interface: non-volatile memory express (NVMe), peripheral component interconnect express (PCIe), serial AT attachment (SATA), small computer system interface (SCSI), serial attached SCSI (SAS), universal storage bus (USB) attached SCSI (UAS), Internet small computer system interface (iSCSI), fiber channel, or fiber channel over Ethernet (FCoE).

The nonvolatile memory interface 145 may provide an interface function for interfacing with nonvolatile memory device 120.

The fingerprint recognition sensor interface 146 may be implemented to provide an interface function for interfacing with the fingerprint recognition sensor controller 102. In an embodiment, the fingerprint recognition sensor interface 146 may be a sideband interface. For example, the sideband interface may be an inter integrated circuit (I2C) interface. However, embodiments of the disclosure may not be limited thereto.

Meanwhile, as illustrated in FIG. 3, the nonvolatile memory device 120 may include a plurality of nonvolatile memories NVMs connected to each of the channels CH1 to CHi. Also, the nonvolatile memory device 120 may be provided with a high voltage from outside of the storage device 100.

Meanwhile, partitions of the storage device 100 according to an embodiment of the disclosure may be managed based on a host program of a host device.

Figure 4:
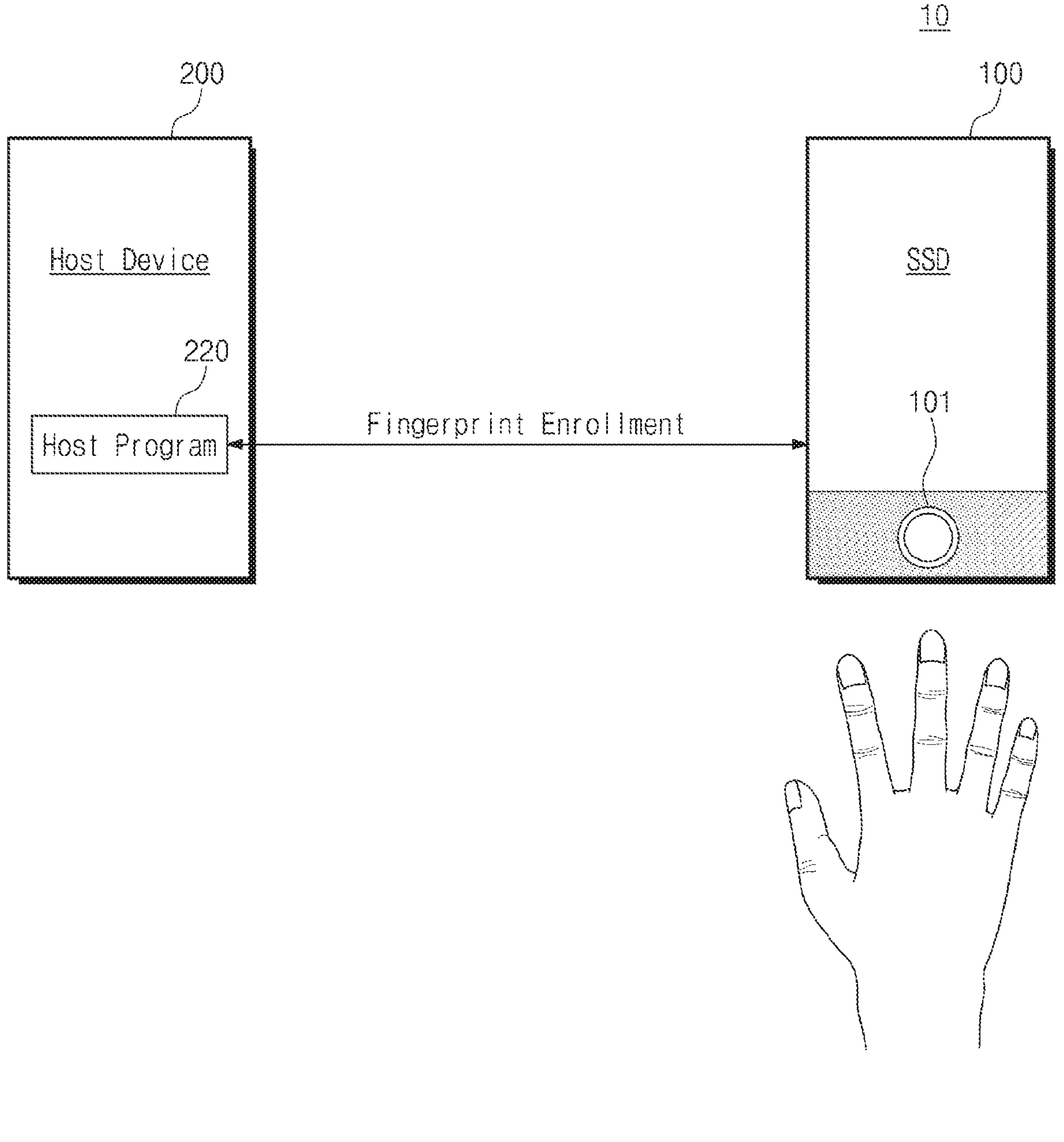
FIG. 4 is a view illustrating a method of managing a partition of the storage device in a computing system, according to an embodiment of the disclosure.

FIG. 4 is a view illustrating a method of managing a partition of the storage device 100 in a computing system 10, according to an embodiment of the disclosure. Referring to FIG. 4, the computing system 10 may include the storage device (SSD) 100 and a host device 200.

The host device 200 may include a host program 220 for managing the storage device 100. The host program 220 may format the storage device 100 connected to the host device 200 and may generate at least one logical drive corresponding to a partition of the storage device 100. In an embodiment, the host program 220 may perform fingerprint enrollment corresponding to the partition of the storage device 100. The host program 220 may issue a fingerprint enrollment request corresponding to a partition of the storage device 100 by a user. The storage device 100 may activate the fingerprint recognition sensor 101 in response to the fingerprint enrollment request. The activated fingerprint recognition sensor 101 may recognize a fingerprint of the user. The fingerprint recognition sensor controller 102 (refer to FIG. 2) may convert or code the recognized fingerprint and may store the converted or coded fingerprint in the storage device 100. In an embodiment, a user fingerprint may be iteratively recognized in a fingerprint enrollment process (e.g., 10 times), and a fingerprint to be enrolled may be generated from the recognized fingerprints, based on a fingerprint enrollment algorithm.

Figure 5:
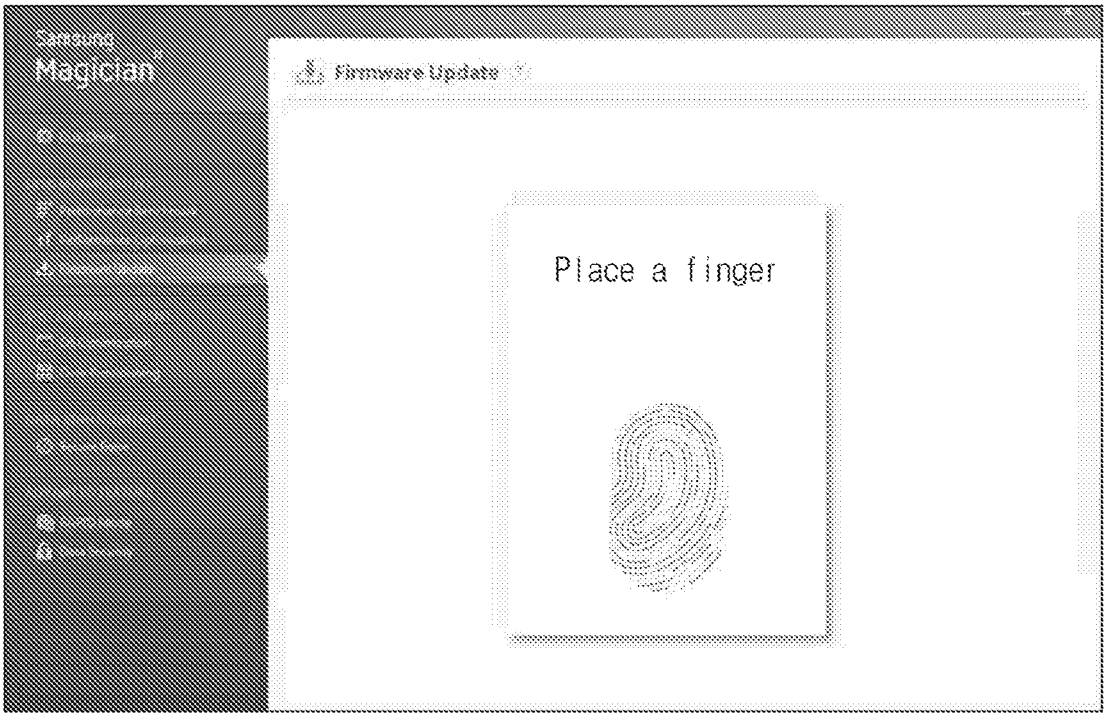
FIG. 5 is a view illustrating a log-in and first fingerprint recognition screen of a host program, according to an embodiment of the disclosure.

FIG. 5 is a view illustrating a log-in and first fingerprint recognition screen of a host program, according to an embodiment of the disclosure. Referring to FIG. 5, a fingerprint recognition operation may be performed by the host program 220 upon updating firmware of the storage device 100. A message, "place a finger" on the fingerprint recognition sensor 101 of the storage device 100 may be displayed. If the user places his/her finger on the fingerprint recognition sensor 101 of the storage device 100 in response to the message, the fingerprint recognition sensor 101 may recognize the user fingerprint. If a fingerprint stored in the storage device 100 is the same as the recognized fingerprint, the host program 220 may perform a legal access to the storage device 100.

Figure 6:
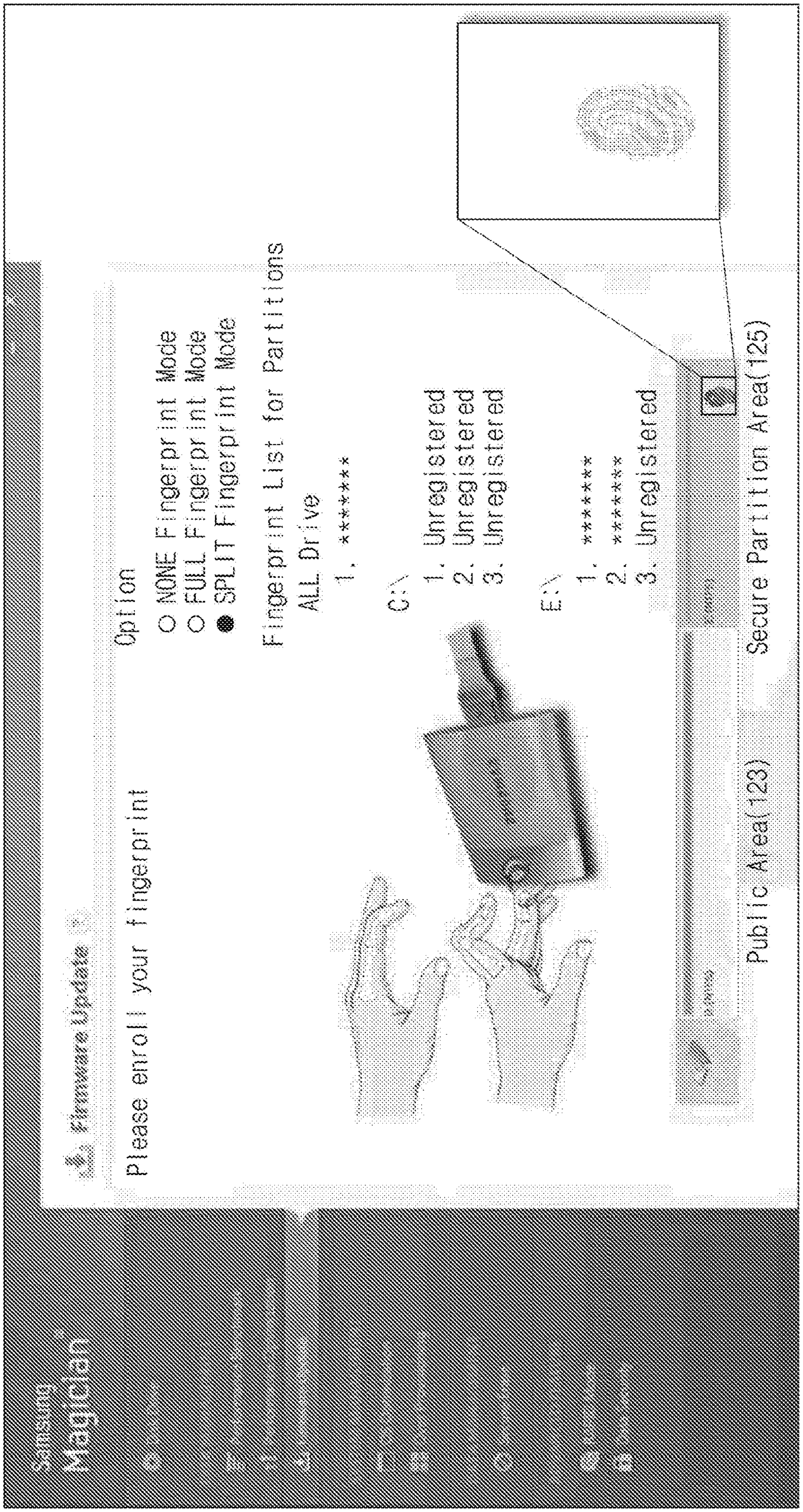
FIG. 6 is a view illustrating a method in which the host program recognizes a fingerprint for each partition, according to an embodiment of the disclosure.

FIG. 6 is a view illustrating a method in which a host program recognizes a fingerprint for each partition, according to an embodiment of the disclosure. Referring to FIG. 6, the host program 220 may manage a partition of the storage device 100 in any one of a none fingerprint mode, a full fingerprint mode, and a split fingerprint mode.

As illustrated in FIG. 6, a logical drive "D" may include a public area 123 and a logical drive "E" may include a secure partition area 125. The public area 123 may be an area that is accessible by the host device 200 without an enrolled fingerprint. The secure partition area 125 may be an area that is accessible by the host device 200 based on an enrolled fingerprint. The host program 220 may perform a process of enrolling a fingerprint corresponding to the secure partition area 125.

FIGS. 7A, 7B, 7C, and 7D are views illustrating various kinds of partition configurations, according to an embodiment of the disclosure.

Figure 7A:
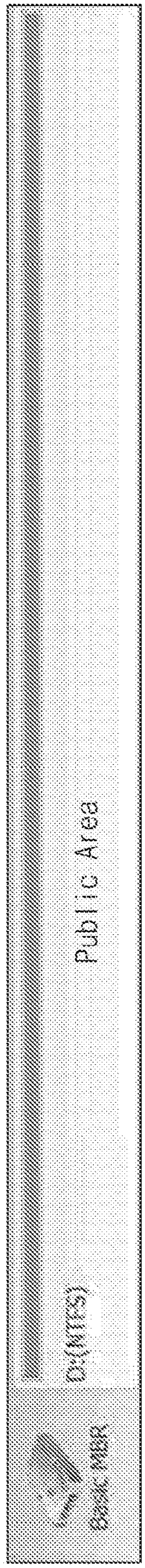
FIGS. 7A, 7B, 7C, and 7D are views illustrating various kinds of partition configurations, according to an embodiment of the disclosure.

Referring to FIG. 7A, the storage device 100 operates in the none fingerprint mode. The whole drive (drive "D") of the storage device 100 may be a public area that is not associated with fingerprint recognition.

Figure 7B:
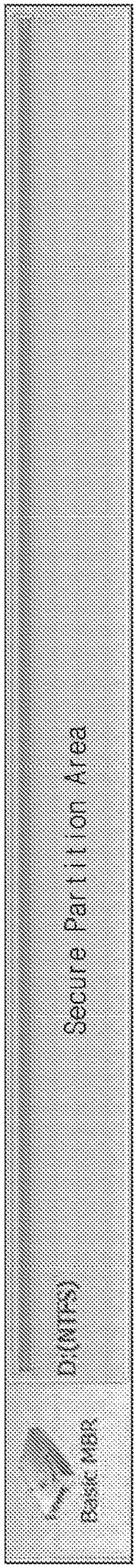

Referring to FIG. 7B, the storage device 100 operates in the full fingerprint mode. The whole drive (drive "D") of the storage device 100 may be a secure partition area that is accessible on the basis of a user fingerprint.

Figure 7C:
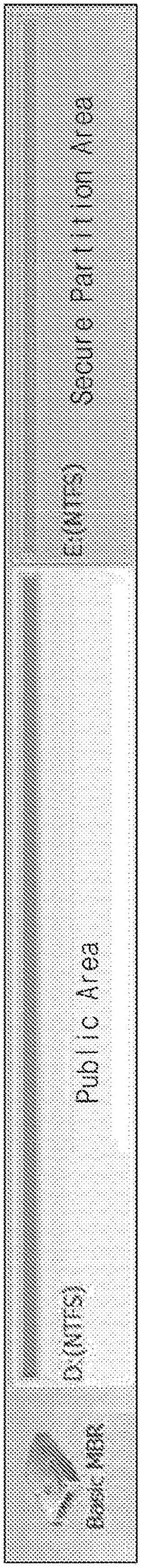

Referring to FIG. 7C, the storage device 100 operates in the split fingerprint mode. A partial space (drive "D") of the storage device 100 may be a public area, and the remaining space (drive "E") of the storage device 100 may be a secure partition area.

Figure 7D:
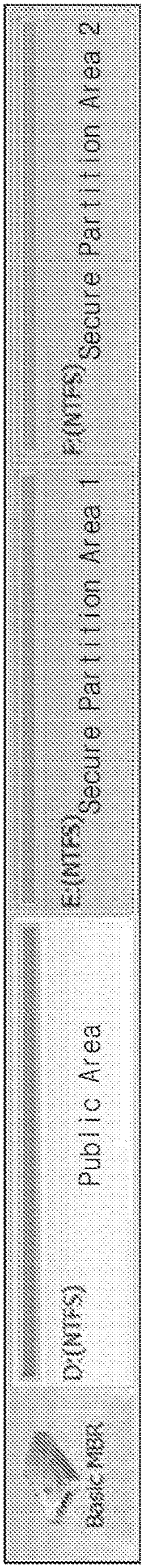

Referring to FIG. 7D, the storage device 100 operates in the split fingerprint mode. A first space (drive "D") of the storage device 100 may be a public area, and a second space (drive "E") and a third space (drive "F") may be secure partition areas. In an embodiment, a fingerprint corresponding to the second space (drive "E") may be different from a fingerprint corresponding to the third space (drive "F").

Figure 8:
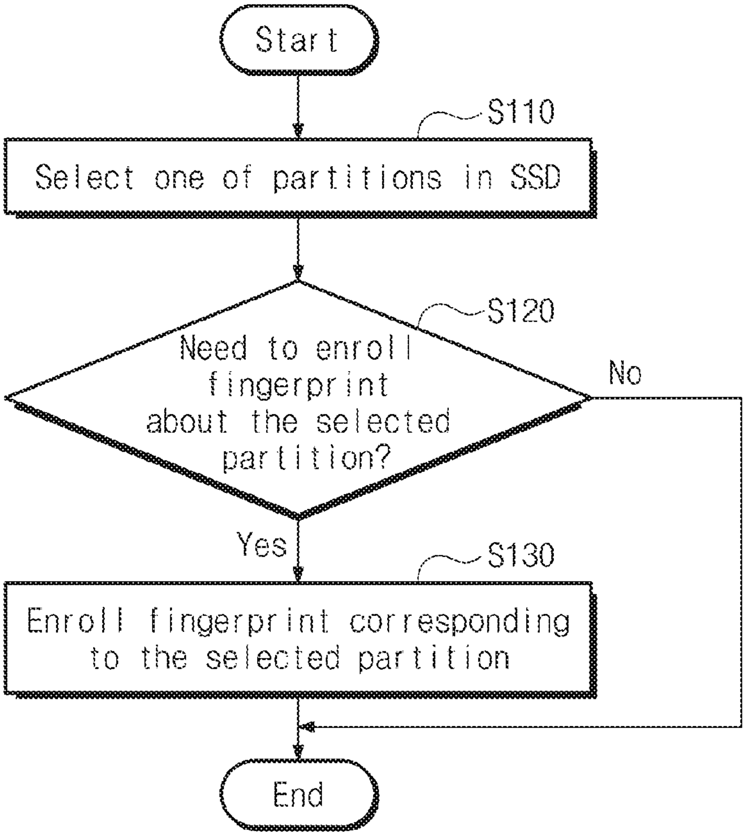
FIG. 8 is a flowchart illustrating a process of enrolling a fingerprint corresponding to a partition of the storage device, according to an embodiment of the disclosure.

FIG. 8 is a flowchart illustrating a process of enrolling a fingerprint corresponding to a partition of a storage device, according to an embodiment of the disclosure. Referring to FIGS. 1 to 8, a process of enrolling a fingerprint will be described below.

The host program 220 (refer to FIG. 4) may select any one of partitions of the storage device 100 (refer to FIG. 4) (S110). Whether to enroll a fingerprint with respect to the selected partition may be determined (S120).

If fingerprint enrollment is necessary, the host program 220 may enroll a fingerprint corresponding to the selected partition (S130). The fingerprint enrollment may include receiving, at the storage device 100, a fingerprint enrollment request from the host program 220, recognizing, at the storage device 100, a fingerprint of a user in response to the received fingerprint enrollment request, storing, at the storage device 100, the recognized fingerprint as a fingerprint corresponding to the selected partition, and notifying the host program 220 that the fingerprint is stored in the storage device 100. In contrast, if the fingerprint enrollment is unnecessary, the fingerprint enrollment process ends.

Figure 9:
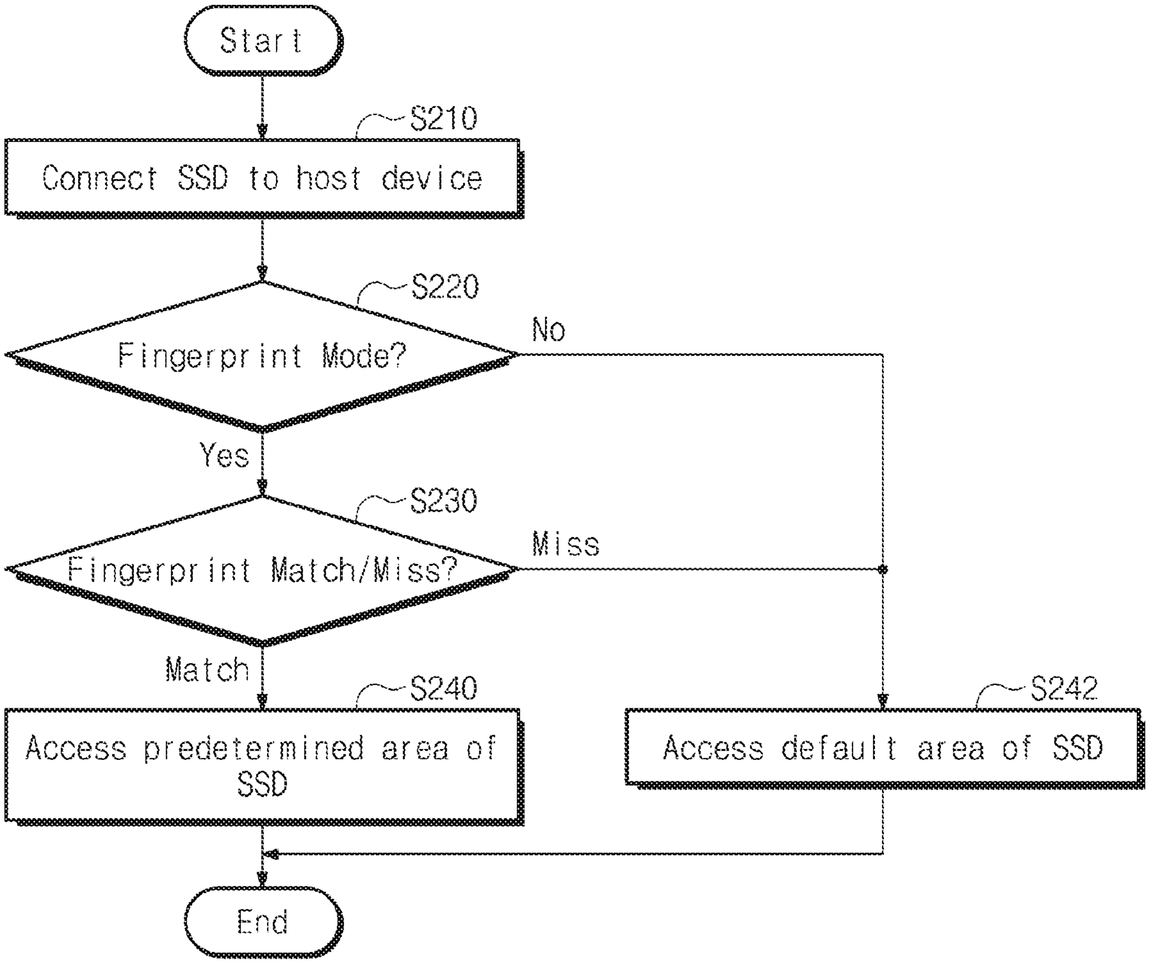
FIG. 9 is a flowchart illustrating a method of accessing the storage device, according to an embodiment of the disclosure.

FIG. 9 is a flowchart illustrating a method of accessing the storage device 100, according to an embodiment of the disclosure. Referring to FIGS. 1 to 9, a method of accessing the storage device 100 will be described below.

The storage device (SSD) 100 may be connected to the host device 200 (refer to FIG. 4) (S210). Whether an operating mode of the storage device 100 is a fingerprint mode may be determined (S220).

If the operating mode is the fingerprint mode, the storage device 100 may first perform a fingerprint recognition operation in response to an input/output request. The storage device 100 may determine whether a user fingerprint is the same as an enrolled fingerprint, through the fingerprint recognition operation (S230). Here, the fingerprint recognition operation may be iteratively performed by the number of times determined in advance.

If the user fingerprint is the same as the enrolled fingerprint, an area of the storage device 100, which is determined in advance, may be accessible by the host device 200 (S240). For example, the area that is determined in advance may be all or a part of a drive expressed with the storage device 100.

In contrast, if the operating mode is not the fingerprint mode or the user fingerprint is not the enrolled fingerprint, only a default area of the storage device 100 may be accessible by the host device 200 (S242). Here, the default area may be the public area described with reference to FIGS. 7C and 7D.

Meanwhile, the storage device 100 according to an embodiment of the disclosure may improve a security function for secure data in connection with fingerprint recognition.

Figure 10:
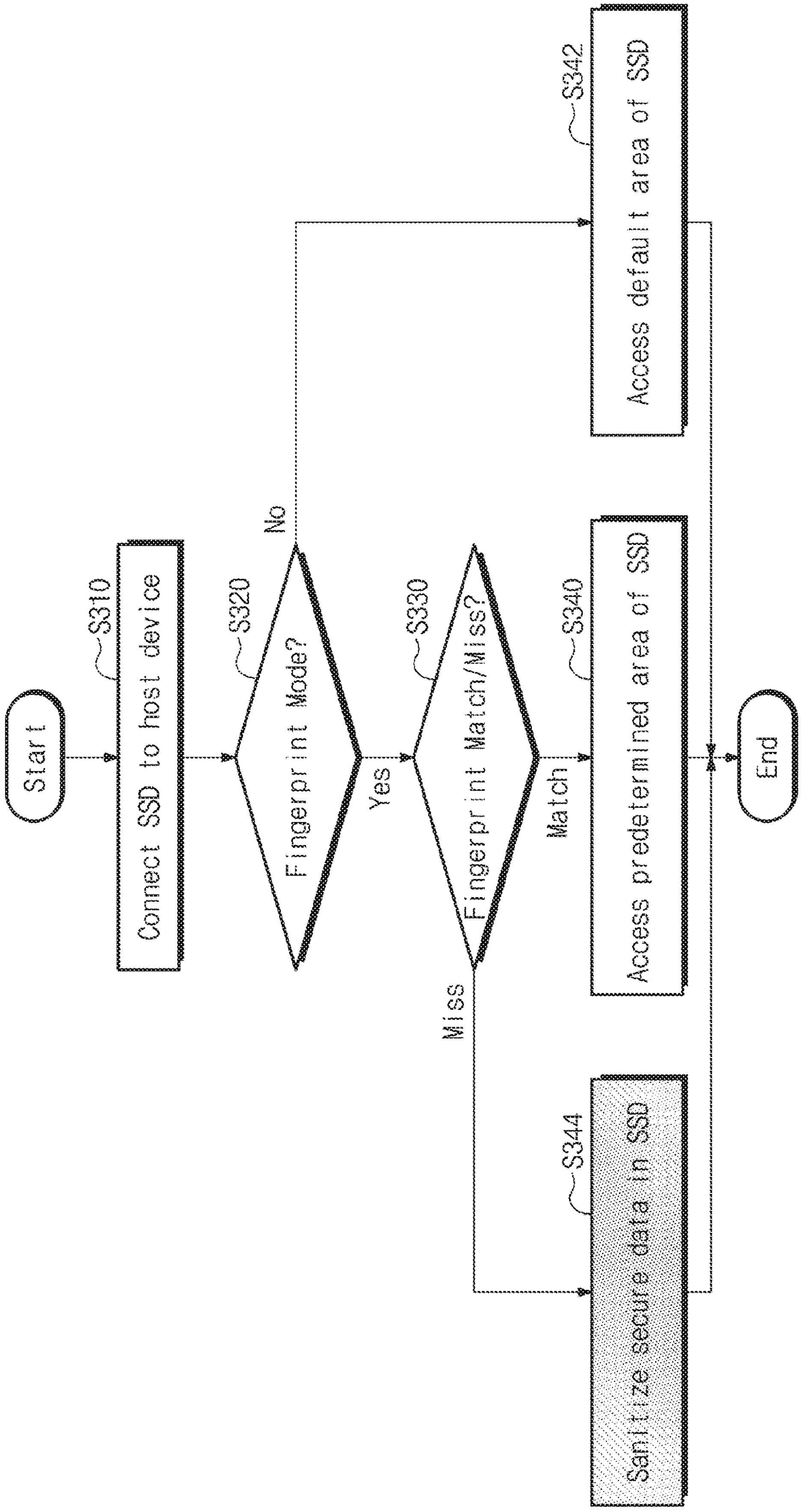
FIG. 10 is a flowchart illustrating a method of accessing the storage device, according to another embodiment of the disclosure.

FIG. 10 is a flowchart illustrating a method of accessing the storage device 100, according to another embodiment of the disclosure. Referring to FIGS. 1 to 10, a method of accessing the storage device 100 will be described below.

Operation S310 and operation S320 may correspond to operation S210 and operation S220 of FIG. 9. If the operating mode is the fingerprint mode, the storage device 100 may first perform a fingerprint recognition operation in response to an input/output request. The storage device 100 may determine whether a user fingerprint is the same as an enrolled fingerprint, through the fingerprint recognition operation (S330). If the user fingerprint is the same as the enrolled fingerprint, an area of the storage device 100, which is determined in advance, may be accessible by the host device 200 (S340).

In contrast, if the operating mode is not the fingerprint mode, only a default area of the storage device 100 may be accessible by the host device 200 (S342).

Also, if the user fingerprint is not the same as the enrolled fingerprint, the storage device 100 may determine that an access to the storage device 100 is made by an illegal user, thus performing a protection function for secure data (e.g., private information). For example, secure data of the storage device 100, which are determined in advance, may be deleted (S344). Secure data to be deleted when fingerprint recognition fails may be determined by the host program 220.

Meanwhile, an embodiment is exemplified in FIGS. 1 to 10 as the fingerprint recognition sensor 101 is included in the storage device 100 to improve a security function. However, embodiments of the disclosure may not be limited thereto. According to an embodiment of the disclosure, a fingerprint recognition sensor of a mobile device may be used to improve a security function.

Figure 11:
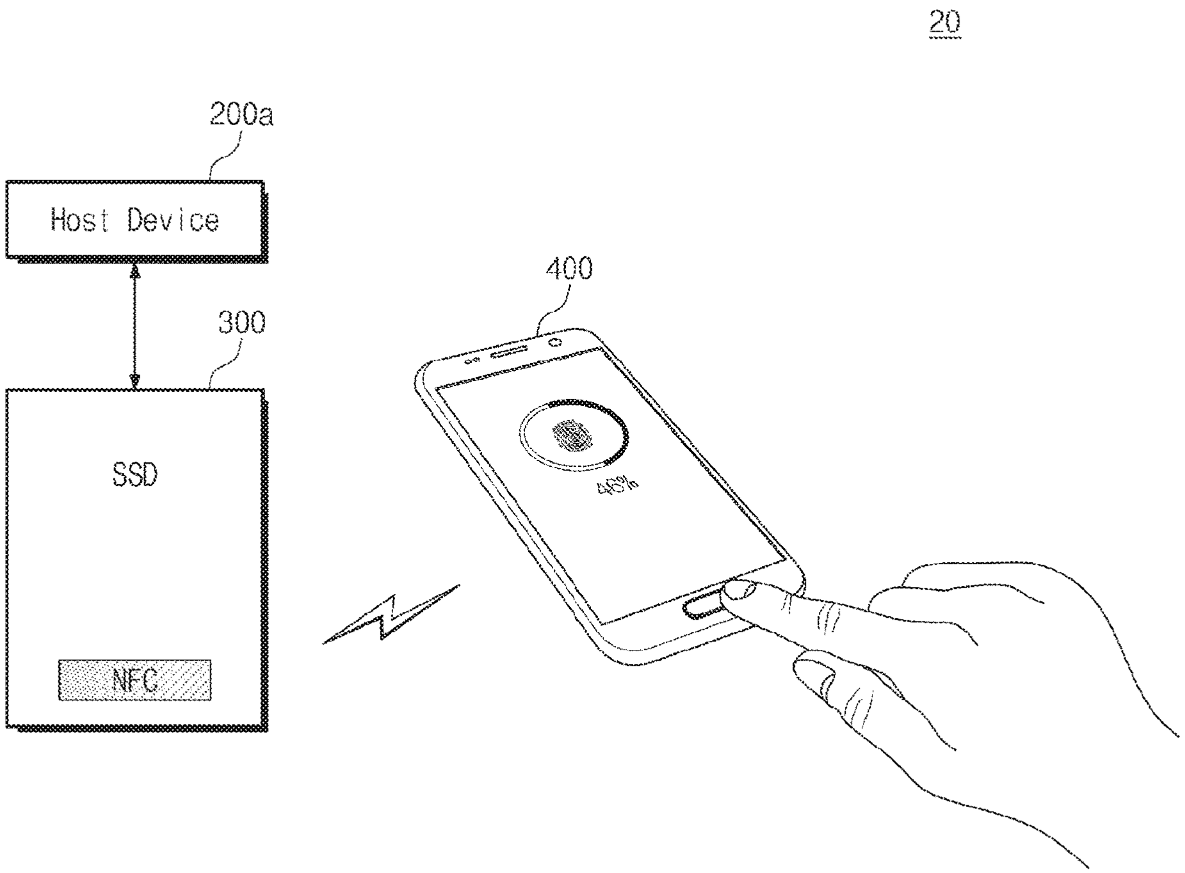
FIG. 11 is a view illustrating a computing system, according to another embodiment of the disclosure.

FIG. 11 is a view illustrating a computing system 20, according to another embodiment of the disclosure. Referring to FIG. 11, the computing system 20 may include a host device 200*a* and a storage device 300. The storage device 300 may be implemented to perform wireless communication with a mobile device 400. For example, a wireless communication function may be near field communication (NFC).

The mobile device 400 may be implemented to recognize and enroll a user fingerprint. The mobile device 400 may include a fingerprint recognition sensor. The mobile device 400 may recognize and check a user fingerprint and may perform wireless communication with the storage device 300. When the user fingerprint is successfully recognized, the mobile device 400 may generate a token corresponding to fingerprint recognition success and may transmit the generated token to the storage device 300 over wireless communication. The storage device 300 may receive the token transmitted from the mobile device 400 and may permit the host device 200*a* to an access the storage device 300. In an embodiment, the token may include a valid time.

In another embodiment, the mobile device 400 may transmit only recognized fingerprint information to the storage device 300. To perform fingerprint recognition, the user may allow the mobile device 400 to approach the storage device 300 while his/her finger is placed on a fingerprint recognition part of the mobile device 400. In this case, fingerprint information recognized in the mobile device 400 may be transmitted to the storage device 300 through NFC (in RFID manner). In an embodiment, the transmitted fingerprint information may be information coded according to a hash algorithm. The storage device 300 may release a fingerprint recognition lock during a given time based on the transmitted fingerprint information. In this case, the host device 200*a* may access the storage device 300. In contrast, in the case where the user does not perform fingerprint recognition, the host device 200*a* may fail to access the storage device 300 of a fingerprint recognition lock mode.

Figure 12:
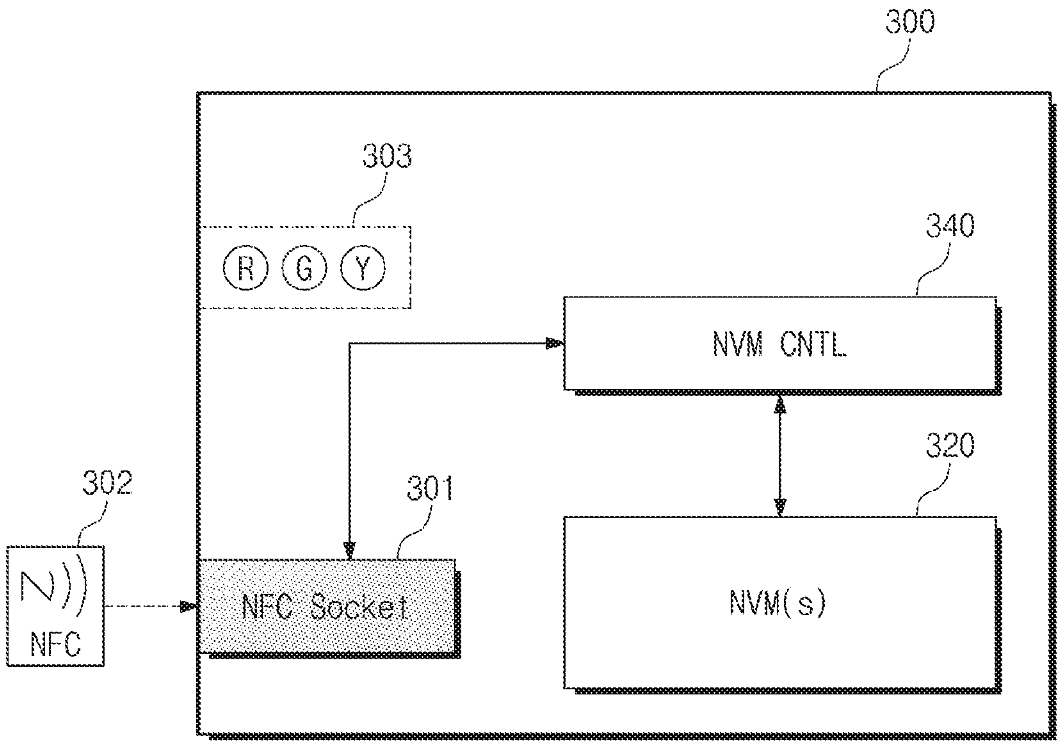
FIG. 12 is a view illustrating the storage device, according to another embodiment of the disclosure.

FIG. 12 is a view illustrating the storage device 300, according to an embodiment of the disclosure. Referring to FIG. 12, the storage device 300 may include an NFC socket 301, a status indication device 303, at least one nonvolatile memory device (NVM(s)) 320, and a memory controller (NVM CNTL) 340.

The NFC socket 301 may be implemented to accommodate an NFC card 302.

The status indication device 303 may include a plurality of light-emitting diodes "R", "G", and "Y" indicating information about fingerprint recognition of a user. The red light emitting diode "R" may indicate fingerprint recognition failure, the green light emitting diode "G" may indicate fingerprint recognition success, and the yellow light emitting diode "Y" may indicate that a fingerprint is being enrolled.

Figure 13:
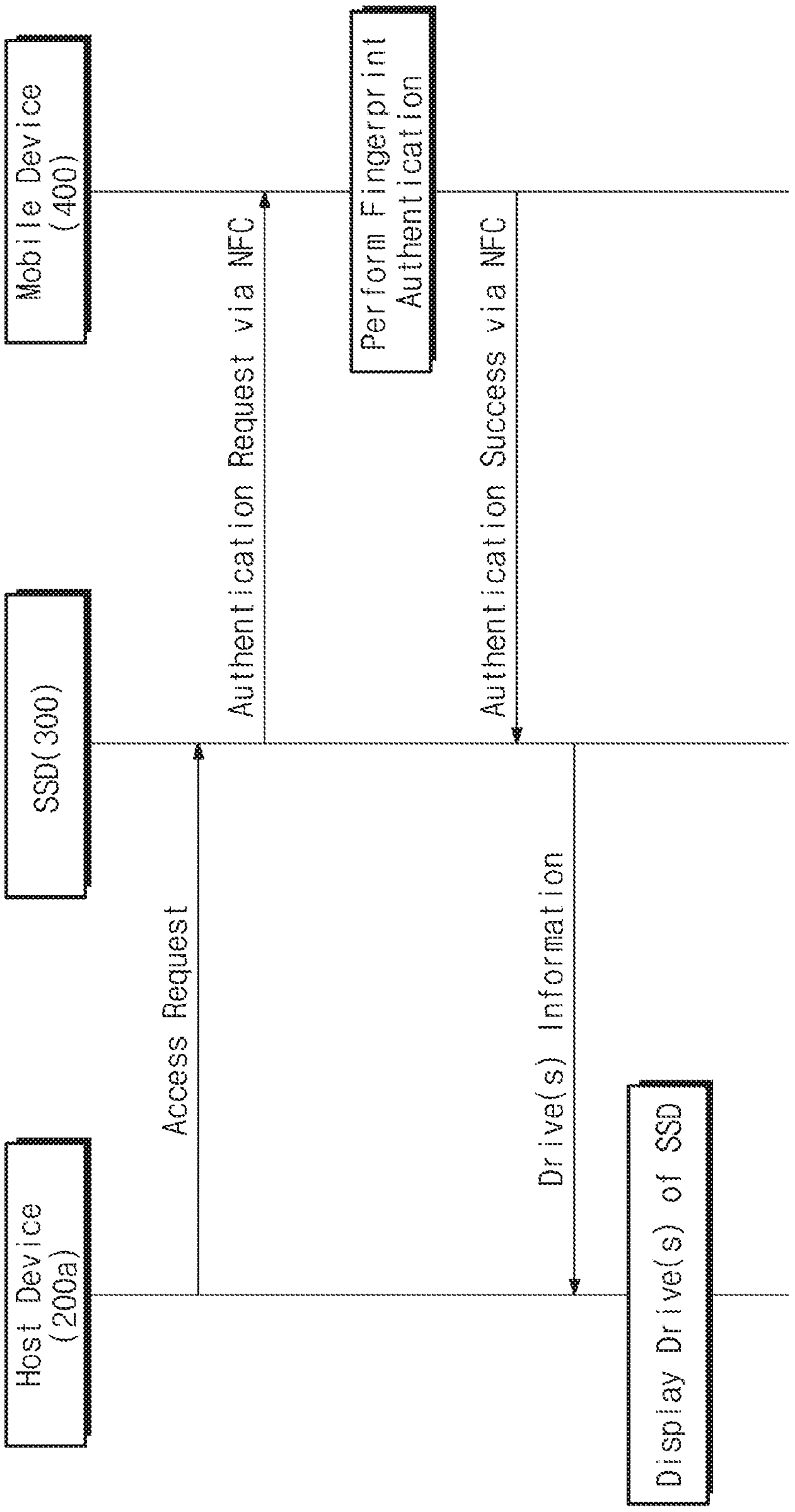
FIG. 13 is a ladder diagram illustrating a method in which a host device accesses the storage device, according to another embodiment of the disclosure.

FIG. 13 is a ladder diagram illustrating a method in which the host device 200*a* accesses the storage device 300, according to another embodiment of the disclosure. Below, a method in which the host device 200*a* accesses the storage device 300 will be described with reference to FIGS. 11 and 13.

The host device 200*a* may issue an access request to the storage device 300. The access request may be a read request or a write request.

The storage device 300 may transmit a request for authenticating a user to the mobile device 400 through NFC in response to the access request of the host device 200*a*.

The mobile device 400 may perform a fingerprint authentication operation on the user in response to the authentication request of the storage device 300. The mobile device 400 may recognize a user fingerprint, may compare an enrolled fingerprint and the recognized fingerprint, and may generate a token corresponding to the comparison result. The mobile device 400 may transmit a token corresponding to authentication success to the storage device 300 through the NFC.

The storage device 300 may receive the token transmitted from the mobile device 400 and may provide the host device 200*a* with drive information of the storage device 300.

The host device 200*a* may display drives of the storage device 300 by using the drive information received from the storage device 300. That is, the host device 200*a* may access a drive of the storage device 300.

Meanwhile, the storage device according to an embodiment of the disclosure may be applicable to a memory card.

Figure 14:
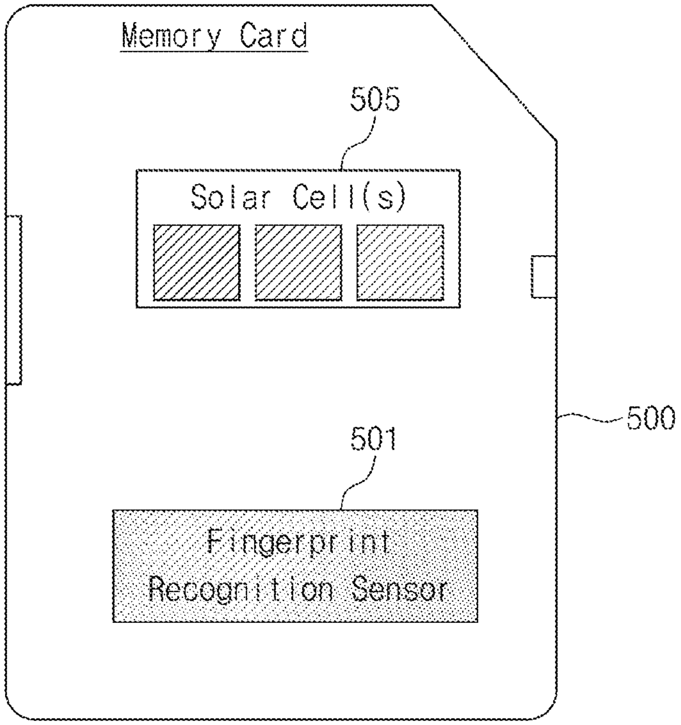
FIG. 14 is a diagram illustrating a memory card, according to an embodiment of the disclosure.

FIG. 14 is a diagram illustrating a memory card, according to an embodiment of the disclosure. Referring to FIG. 14, a memory card 500 may include a fingerprint recognition sensor 501 and at least one solar cell 505. The solar cell 505 may receive light and may generate power for activating the fingerprint recognition sensor 501 by using the received light. Although not illustrated in FIG. 14, the memory card 500 may include a nonvolatile memory device and a memory controller to control the nonvolatile memory device. Here, the nonvolatile memory device may be implemented to be the same as the nonvolatile memory device 120 illustrated in FIG. 2, and the memory controller may be implemented to be the same as the memory controller 140 illustrated in FIG. 2.

In an embodiment, the memory card 500 may enroll and recognize a user fingerprint and may permit an access of an external host device based on the recognized fingerprint.

The memory card 500 according to an embodiment of the disclosure may be a secure digital (SD) card, a micro SD card, a universal flash storage (UFS) card, etc.

According to an embodiment of the disclosure, a storage device and an operating method thereof may improve a security function by controlling an access of a host device to a partition through fingerprint recognition.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to embodiments, it will be apparent to those skilled in the art that various changes and modifications may be made without departing from the spirit and scope of the disclosure. Therefore, it should be understood that the above embodiments are not limiting, but illustrative.

What is claimed is:

1. A storage device comprising:
- a nonvolatile memory device having at least one secure partition area and a public area;
- a memory controller configured to control the nonvolatile memory device; and
- a fingerprint recognition sensor configured to recognize a fingerprint of a user, wherein:
- the at least one secure partition area is accessible, through the memory controller, by a host device when a fingerprint recognized by the fingerprint recognition sensor is the same as an enrolled fingerprint stored by the nonvolatile memory device, and
- the public area is accessible, through the memory controller, by the host device regardless of whether the fingerprint recognized by the fingerprint recognition sensor is the same as the enrolled fingerprint.

2. The storage device of claim 1, further comprising a fingerprint recognition sensor controller configured to control the fingerprint recognition sensor and to enroll the fingerprint of the user or compare the fingerprint recognized by the fingerprint recognition sensor and the enrolled fingerprint.

3. The storage device of claim 2, further comprising a fingerprint recognition interface configured to communicate with the fingerprint recognition sensor controller.

4. The storage device of claim 1, further comprising a status indication device configured to display an indication of whether the fingerprint recognized by the fingerprint recognition sensor is the same as the enrolled fingerprint.

5. The storage device of claim 4, wherein the status indication device includes:
- a first light emitting diode indicating that the fingerprint recognized by the fingerprint recognition sensor is the same as the enrolled fingerprint;
- a second light emitting diode indicating that the fingerprint recognized by the fingerprint recognition sensor is not the same as the enrolled fingerprint; and
- a third light emitting diode indicating that the fingerprint of the user is enrolled.

6. The storage device of claim 1, wherein the memory controller activates the fingerprint recognition sensor when an operating mode is a security mode.

7. The storage device of claim 1, wherein the fingerprint recognition sensor is activated in response to a request of an external host program.

8. The storage device of claim 1, wherein the storage device is a removable solid state drive.

9. A storage device comprising:
- a nonvolatile memory device having at least one secure partition area and a public area;
- a memory controller configured to control the nonvolatile memory device; and
- a fingerprint recognition sensor configured to recognize a fingerprint of a first user, wherein:
- the at least one secure partition area is accessible, through the memory controller, by a host device when a fingerprint recognized by the fingerprint recognition sensor is the same as an enrolled fingerprint stored by the nonvolatile memory device, the public area is accessible, through the memory controller, by the host device regardless of whether the fingerprint recognized by the fingerprint recognition sensor is the same as the enrolled fingerprint, and the at least one secure partition area includes:

a first secure partition area corresponding to a first enrolled fingerprint stored by the nonvolatile memory device; and a second secure partition area corresponding to a second enrolled fingerprint, which is different from the first enrolled fingerprint, stored by the nonvolatile memory device.

10. The storage device of claim 9, wherein the first enrolled fingerprint is a fingerprint of a first finger of the first user and the second enrolled fingerprint is a fingerprint of a second finger of a second user.

11. The storage device of claim 9, further comprising a fingerprint recognition sensor controller configured to control the fingerprint recognition sensor and to enroll the fingerprint of the first user or compare the fingerprint recognized by the fingerprint recognition sensor and the enrolled fingerprint.

12. The storage device of claim 11, further comprising a fingerprint recognition interface configured to communicate with the fingerprint recognition sensor controller.

13. The storage device of claim 9, further comprising a status indication device configured to display an indication of whether the fingerprint recognized by the fingerprint recognition sensor is the same as the enrolled fingerprint.

14. The storage device of claim 13, wherein the status indication device includes:

a first light emitting diode indicating that the fingerprint recognized by the fingerprint recognition sensor is the same as the enrolled fingerprint;

a second light emitting diode indicating that the fingerprint recognized by the fingerprint recognition sensor is not the same as the enrolled fingerprint; and a third light emitting diode indicating that the fingerprint of the first user is enrolled.

15. The storage device of claim 9, wherein the memory controller activates the fingerprint recognition sensor when an operating mode is a security mode.

16. A storage device comprising:

a nonvolatile memory device having at least one secure partition area and a public area;

a memory controller configured to control the nonvolatile memory device; and a fingerprint recognition sensor configured to recognize a fingerprint of a user, wherein:

the at least one secure partition area is accessible, through the memory controller, by a host device when a fingerprint recognized by the fingerprint recognition sensor is the same as an enrolled fingerprint stored by the nonvolatile memory device, the public area is accessible, through the memory controller, by the host device regardless of whether the fingerprint recognized by the fingerprint recognition sensor is the same as the enrolled fingerprint, and the memory controller deletes data, which are determined in advance, when an operating mode is a security mode and the fingerprint recognized by the fingerprint recognition sensor is different from the enrolled fingerprint.

17. The storage device of claim 16, further comprising a fingerprint recognition sensor controller configured to control the fingerprint recognition sensor and to enroll the fingerprint of the user or compare the fingerprint recognized by the fingerprint recognition sensor and the enrolled fingerprint.

18. The storage device of claim 17, further comprising a fingerprint recognition interface configured to communicate with the fingerprint recognition sensor controller.

19. The storage device of claim 16, further comprising a status indication device configured to display an indication of whether the fingerprint recognized by the fingerprint recognition sensor is the same as the enrolled fingerprint.

20. The storage device of claim 19, wherein the status indication device includes:

a first light emitting diode indicating that the fingerprint recognized by the fingerprint recognition sensor is the same as the enrolled fingerprint;

a second light emitting diode indicating that the fingerprint recognized by the fingerprint recognition sensor is not the same as the enrolled fingerprint; and a third light emitting diode indicating that the fingerprint of the user is enrolled.

* * * * *